(12) United States Patent
Motsinger

(10) Patent No.: US 6,789,509 B1
(45) Date of Patent: Sep. 14, 2004

(54) LARIAT WITH LOW-FRICTION HONDA ARM SOCKS

(76) Inventor: Guy Dale Motsinger, 606 County Rd. 35, Bunnell, FL (US) 32110

( * ) Notice: Subject to any disclaimer, the term of this patent is extended or adjusted under 35 U.S.C. 154(b) by 0 days.

(21) Appl. No.: 10/310,325

(22) Filed: Dec. 5, 2002

Related U.S. Application Data

(63) Continuation-in-part of application No. 09/960,911, filed on Sep. 24, 2001, now abandoned.

(51) Int. Cl.$^7$ .............................................. A01K 15/04
(52) U.S. Cl. ...................................... 119/805; 119/804
(58) Field of Search ................................ 119/804, 805, 119/801, 802; 24/115 R; 425/500

(56) References Cited

U.S. PATENT DOCUMENTS

| | | | |
|---|---|---|---|
| 2,643,638 A | * 6/1953 | Villmer | ........................ 119/805 |
| 3,165,091 A | 1/1965 | Welton | |
| 4,117,625 A | 10/1978 | O'Neil | |
| 4,165,712 A | 8/1979 | Crowley, Jr. | |
| D261,229 S | 10/1981 | Dvorsky | |
| 4,562,793 A | 1/1986 | Simpson | |
| 4,599,074 A | * 7/1986 | Beckly | ........................ 119/804 |
| 4,762,318 A | * 8/1988 | Phillips et al. | ............ 24/115 R |
| 4,928,634 A | 5/1990 | Voigt | |
| 5,340,120 A | 8/1994 | Holyoak | |
| 5,556,353 A | 9/1996 | Beers | |
| 5,674,159 A | * 10/1997 | Davidson | ........................ 482/92 |
| D389,549 S | 1/1998 | Beers | |
| 5,806,469 A | 9/1998 | Cooper-Ratliff et al. | |
| 5,941,198 A | 8/1999 | Sullivan | |
| 6,044,801 A | 4/2000 | Chavez | |
| 6,067,942 A | 5/2000 | Fernandez | |
| 6,119,632 A | 9/2000 | Sullivan | |
| 6,142,104 A | 11/2000 | Sullivan | |
| 2002/0052270 A1 | * 5/2002 | Hinds | ........................ 482/126 |

* cited by examiner

Primary Examiner—Elizabeth Shaw
(74) Attorney, Agent, or Firm—Paul S. Rooy

(57) ABSTRACT

An improved lariat comprising a honda arm sock around each honda arm adjacent the honda knot. The honda arm socks are manufactured of low-friction material. When the lariat loop closes, its tail slides against the honda arm socks. Due to the low-friction characteristics of the honda arm socks, closure rate of the lariat loop is increased, and heat and friction are reduced. Consequently, a roped animal has less chance to shake off the lariat, and rope breakdown is decreased in the rope from which the improved lariat is made, thus increasing lariat life. Optimized honda arm sock weight and dimensions and materials are disclosed. An additional improved lariat embodiment incorporates a tail sock disposed around the improved lariat tail adjacent the honda knot. The tail sock helps maintain rope stiffness in the tail in the vicinity of the honda knot, thus favorably affecting the handling characteristics of the improved lariat. In addition, the tail sock helps reduce bend-induced rope fraying and breakdown, thus increasing the life of the improved lariat.

22 Claims, 3 Drawing Sheets

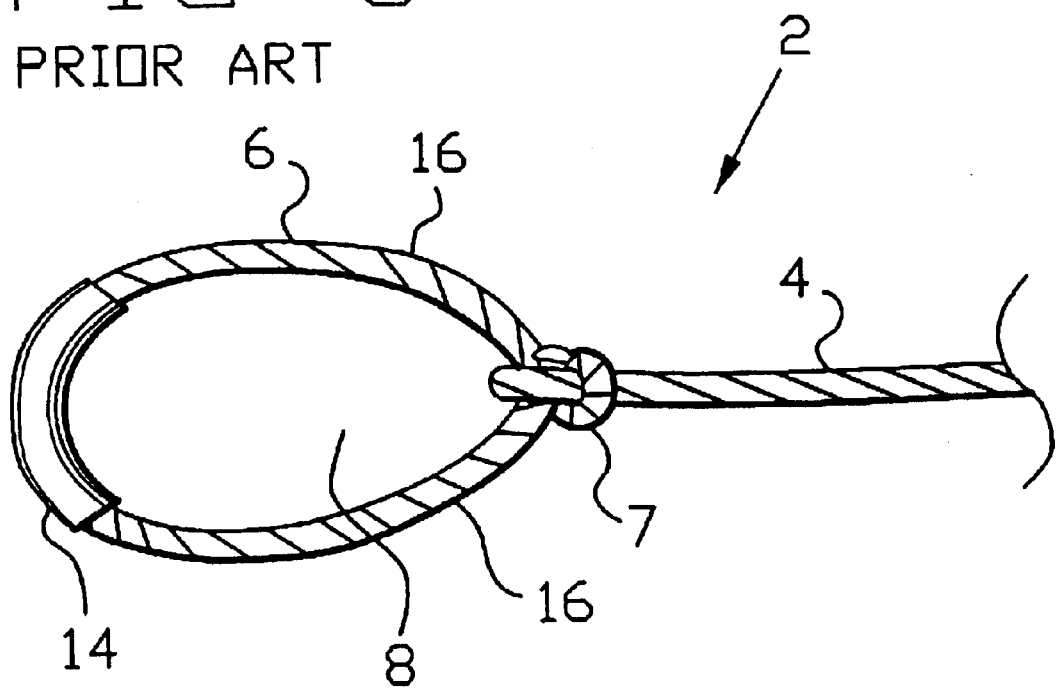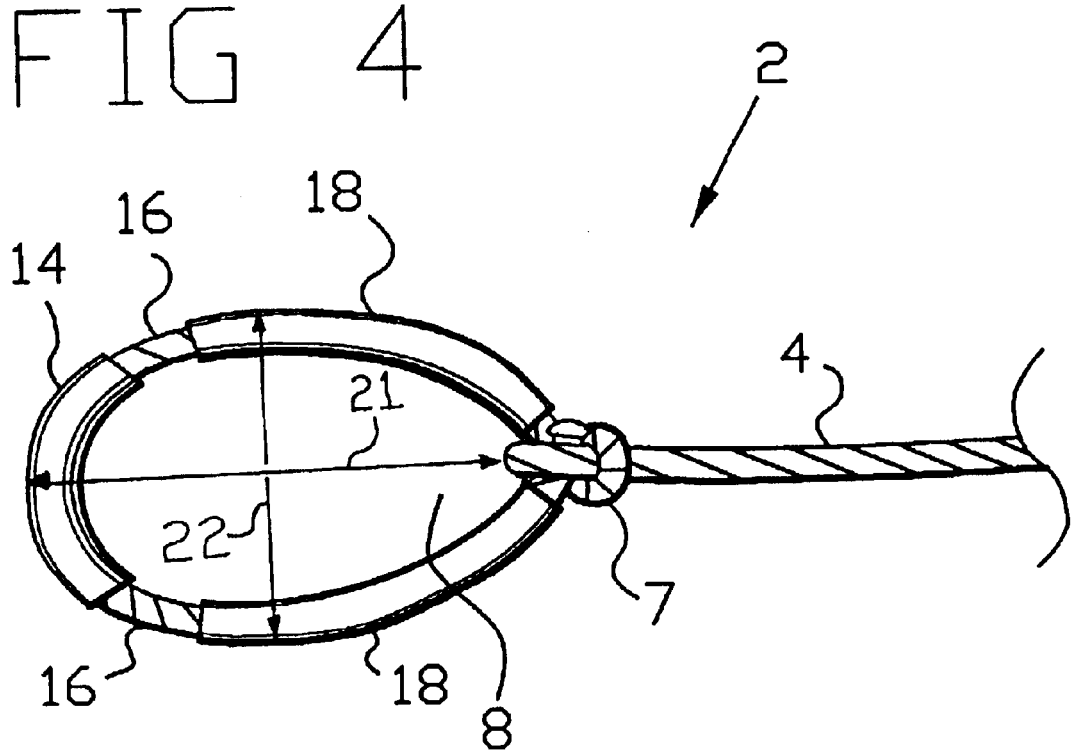

LARIAT WITH LOW-FRICTION HONDA ARM SOCKS

This application is a Continuation-In-Part of U.S. Utility patent application Ser. No. 09/960,911 filed Sep. 24, 2001, now abandoned and under 35 U.S.C. § 120 claims priority on, and the benefit of, the filing date of that application.

BACKGROUND OF THE INVENTION

1. Field of the Invention

This invention relates to lariats, and in particular to an improved lariat with low-friction honda arm socks.

2. Background of the Invention

Lariats originally evolved as an early cowboy's most important tool. Cowboys used lariats to catch cattle, to tie horses in place, to pull wagons across rivers and swamps, to kill snakes, etc. A famous quotation from Ramon F. Adams book *Western Words* states the cowboy "... does everything with his rope except eat with it." The word lariat evolved from the Spanish la reata, meaning the rope.

Early cowboys used ropes made of horsehair, grass or henequen. Most lariat ropes today are made of nylon. Typically, cowboy lariats range from 30 to 70 feet in length.

As may be observed in FIG. 1, lariat 2 comprises tail 4 attached to honda 6 at honda knot 7. Honda 6 comprises honda aperture 8 sized to slidably admit tail 4. Tail 4 is disposed within honda aperture 8. That portion of tail 4 which extends from honda knot 7 to honda aperture 8 defines lariat loop 12.

Referring now also to FIG. 2, lariat 2 is operated by sizing lariat loop 12 as appropriate to admit whatever object is to be snared within lariat loop 12. Lariat 2 is then thrown so that lariat loop 12 passes over the object to be snared. The object to be snared could be the neck of a cow, a wagon tongue, etc.

Once the object to be snared is disposed within lariat loop 12, tail 4 is pulled so that tail 4 slides through lariat loop 12 in a direction away from honda 6, as indicated by arrow 10 in FIG. 2, thus diminishing the size of lariat loop 12 in order to close lariat loop 12 around the snared object. Besides their traditional uses as a cowboy tool, lariats currently enjoy widespread popularity in rodeo events. Rodeo means both the sport of exercising the traditional skills required of working cowboys, and the competitive event where such sport is exercised competitively.

Modern rodeos may include bareback bronc riding, saddle bronc riding, bull riding, calf roping, steer wrestling, team roping, steer roping, and barrel racing. The events which require skillful use of the lariat include calf roping, steer roping, and team roping.

Calf roping requires a contestant to chase a calf while the contestant is riding a horse. The contestant ropes the calf while still riding on his horse, dismounts, throws the calf to the ground and ties three of its legs together. The horse has been trained to keep backing up from the time the calf is roped in order to keep the lariat loop tight around the calf's neck until the contestant can tie the calf legs together. The contestant who can accomplish these tasks fastest wins. The calf roping event is designed to test both the contestant's roping skills with the lariat as well as the excellence of teamwork exhibited by the contestant and the contestant's horse.

Steer roping is one of the most important rodeo events. A contestant on horseback lassoes the steer around the horns from one side of the steer. The contestant, still on horseback, then races around the rear of the steer to its other side, causing the steer to trip over the lariat tail. The contestant then quickly dismounts and ties the steer's hind legs together. The contestant who can accomplish these tasks fastest wins.

The team roping event involves two contestants working together. The object is for one contestant to rope a steer's horns, and the other contestant to rope the steer's hind legs. After each contestant ropes his assigned part of the steer, the contestants pull their lariats tight, such that the tails of the respective lariats form straight lines intersecting at the steer, forming a 90 degree angle relative to each other. When both contestants have their lariats tight at a 90 degree angle relative to each other the event is over. Whichever team accomplishes these tasks fastest wins.

The above events all require close coordination between the contestants and their horses, and the winner is determined based on speed. One aspect of finishing an event promptly is the speed of closure of the lariat loops. The faster the lariat loop closes, the shorter the event time. Thus, it is an important consideration in lariat design to provide for the fastest possible lariat loop closure. Potentially of even more importance, the faster the lariat loop closure, the less the chance that the animal will succeed in shaking off the lariat before the lariat loop has a chance to tighten around the animal. If the animal were to shake off the lariat the contestant would have to start all over, thus incurring a time delay which would probably prove fatal to that contestant's chances of winning the event.

Existing Designs

Referring now to FIG. 3, a detail view of a prior art honda, currently available lariats 2 incorporate a burner 14 disposed at an extreme of honda 6 opposite honda knot 7. Honda 6 itself comprises honda knot 7, from which honda arms 16 emanate. Burner 14 serves to keep honda 6 and tail 4 from overheating when tail 4 is pulled through honda aperture 8 in order to close lariat loop 12. Burner 14 is made of rawhide or other appropriate material.

In order to speed the closure rate of lariat loop 12, currently available lariats are typically coated with a substance such as wax paraffin, which helps reduce friction between honda 6 and tail 4. In addition, such coatings help stiffen the lariat for more accuracy and ease in handling, help prevent the lariat rope from suffering from sun rot, and thereby help slow rope break-down, and help prevent the rope from fraying.

When closing lariat loop 12, tail 4 rubs against honda arms 16 in currently available lariats 2. Thus, it would be desirable to provide a lariat 2 which minimizes the friction between tail 4 and honda arms 16 when closing lariat loop 12, in order to maximize the closure speed of lariat loop 12.

In accomplishing this objective, it is important to understand that the weight and balance of lariat 2 must not be altered appreciably, particularly in the lariat honda 8 and lariat loop 12 areas. This is crucial because roping events contestants are accustomed to a standard weight and balance, or "feel", of the lariat. For example, a standard lariat burner 14 weighs around 8 grams, and appreciably changing its weight would change the "feel" of the lariat and hurt a contestant's score.

Another important consideration to be taken into account when using honda socks to reduce the friction between lariat tail 4 and honda arms 16 is that while sufficiently long honda arm socks should be employed, they should not be any longer than necessary in order to prevent weight build-up. Such increased honda weight is undesirable as explained above, because it could hurt a contestant's performance.

Thus, it is important to optimize the dimensions of any honda arm socks installed.

SUMMARY OF THE INVENTION

Accordingly, it is an object of the present invention to provide an improved lariat with low-friction honda arm socks whose lariat loop closes faster than conventional lariat loops. Design features allowing this object to be accomplished include a honda arm sock on each honda arm adjacent the honda knot. Advantages associated with the accomplishment of this object include faster roping, and reduction of the chance that a roped animal will have time to shake the lariat loop off before it can be tightened.

It is another object of the present invention to provide an improved lariat with low-friction honda arm socks which does not appreciably change the lariat weight and balance. Design features allowing this object to be accomplished include a low-weight honda arm sock on each honda arm adjacent the honda knot. Benefits associated with the accomplishment of this object include substantial preservation of the original lariat weight and balance, or "feel", and thus the contestant is provided a faster lariat which "feels" the same as the original, un-improved lariat.

It is still another object of the present invention to provide an improved lariat with low-friction honda arm socks which does not appreciably change the lariat weight and balance. Design features allowing this object to be accomplished include a low-weight honda arm sock on each honda arm of dimensions optimized to minimize any weight and balance change which may be caused by the honda arm socks. Benefits associated with the accomplishment of this object include substantial preservation of the original lariat weight and balance, or "feel", and thus providing the contestant a faster lariat which "feels" the same as the original, un-improved lariat.

It is another object of the present invention to provide an improved lariat with low-friction honda arm socks with longer-lasting honda arms. Design features allowing this object to be accomplished include a honda arm sock on each honda arm adjacent the honda knot. A benefit associated with the accomplishment of this object is a longer lasting lariat, and the cost savings associated with purchasing less replacement lariats.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIGS. 1 and 2. Sheet two contains FIGS. 3 and 4. Sheet three contains FIG. 5.

FIG. 3 is a front detail isometric view of a prior art lariat honda.

FIG. 4 is a front detail isometric view an improved lariat with honda arm socks.

DETAILED DESCRIPTION OF THE PREFERRED EMBODIMENT

Figure 1:
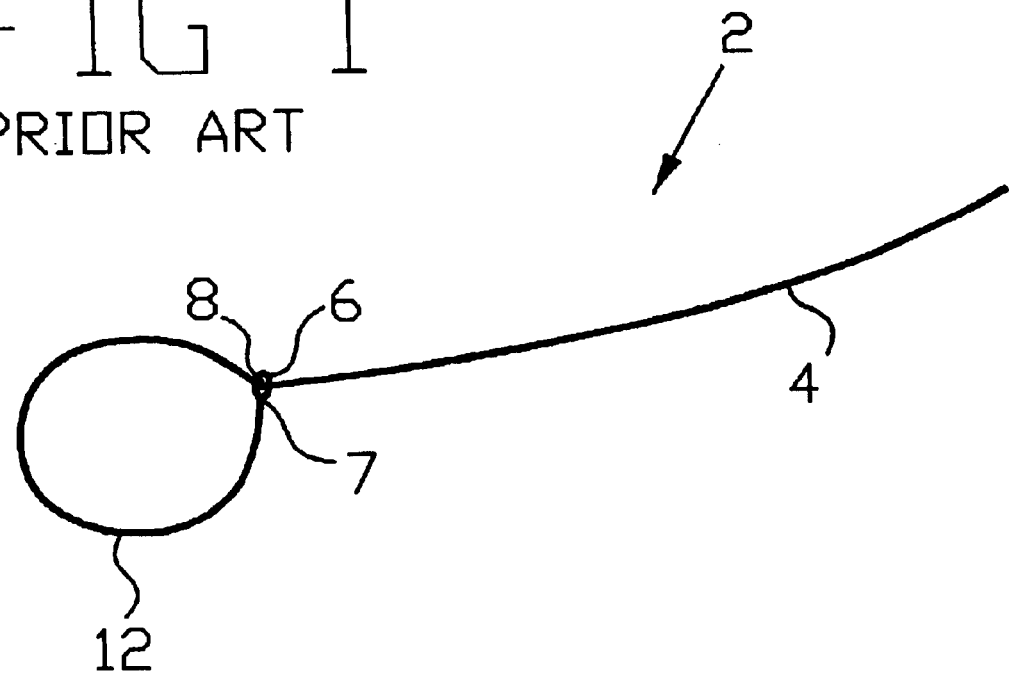
FIG. 1 is a front isometric view of a prior art lariat with its lariat loop open.
Figure 2:
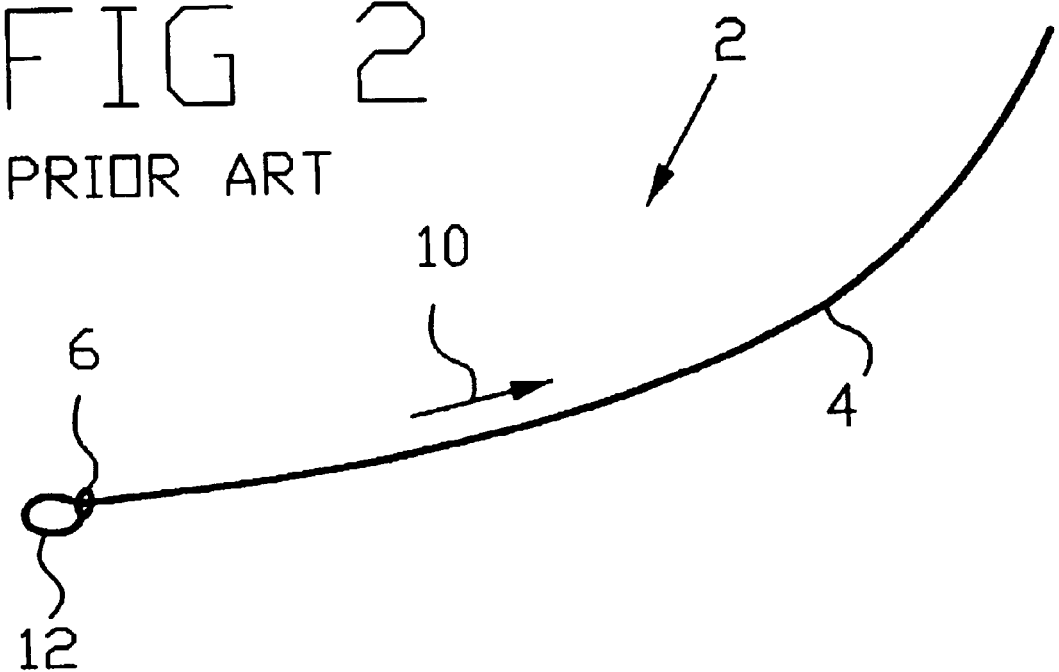
FIG. 2 is a front isometric view of a prior art lariat with its lariat loop closing.

Referring now to FIG. 4 we observe a front detail isometric view of improved lariat 2 honda 6 with a honda arm sock 18 installed on each honda arm 16. When lariat loop 12 closes, tail 4 tends to ride against one or the other honda arm 16. Tis rope-to-rope rubbing causes friction and heat, which slow lariat loop 12 closure rate and contribute to rope breakdown.

Installation of honda arm socks 18 permits tail 4 to ride on one or both honda arm socks 18 when lariat loop 12 is closing. One honda arm sock 18 is disposed around each honda arm 16 adjacent honda knot 7. In the preferred embodiment, honda arm socks 18 were made of low-friction material such as polyvinyl chloride (PVC) shrink-wrap material. This material exhibits a smooth, plastic-like outer surface, and generates little friction when the rope from which tail 4 is made slides against it. Thus, improved lariat 2 equipped with honda arm socks 18 exhibits substantially less friction than conventional lariats. This reduction in friction contributes directly to faster lariat loop closure rates, and to reduced rope wear from heat and friction at honda 6.

Figure 5:
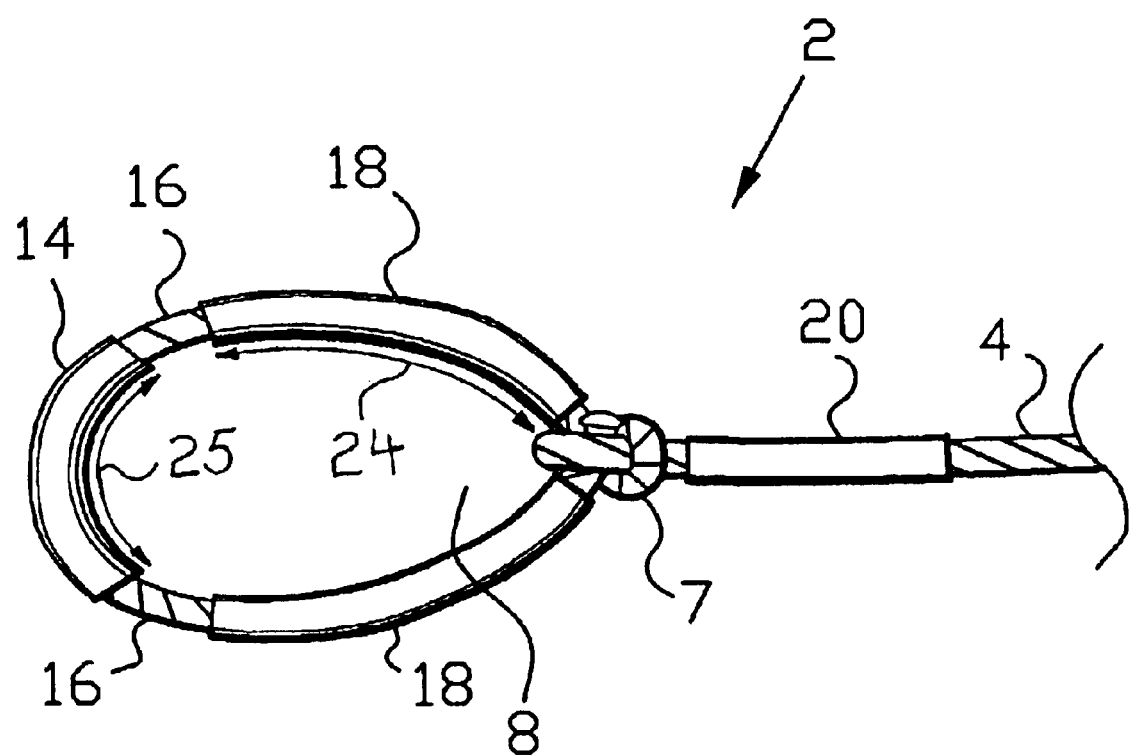
FIG. 5 is a front detail isometric view of an improved lariat with honda arm socks and a tail sock.

FIG. 5 is a front detail isometric view of improved lariat 2 with honda arm socks 18 and tail sock 20. Tail sock 20 is installed around tail 4 adjacent honda knot 7, Tail sock 20 helps stiffen improved lariat 2 tail 4 in the vicinity of honda knot 7. Thus, tail sock 20 improves the handling characteristics of improved lariat 2, and also protects tail 4 from fraying and bending-induced breakdown in the vicinity of honda knot 7. In the preferred embodiment, tail sock 20 was made of shrink-wrap polyvinyl chloride (PVC) to save weight.

In the preferred embodiment, honda arm socks 18 and tail sock 20 were manufactured of polyvinyl chloride (PVC), plastic, synthetic, or other appropriate material. This material was chosen because of its low weight.

A standard lariat honda circumference is 8 inches, as it was in the preferred embodiment. In the preferred embodiment, honda length 21 was 3.5±1.0 inches, honda width 22 was 1.5±1.0 inches, and burner length 25 was 2±0.5 inches. Honda arm sock length 24 was 3±1.0 inches, and each honda arm sock 18 weighed 1.5±1.0 grams. Thus, the weight contribution of honda arm socks 18 was approximately 3 grams, compared to the preferred embodiment burner weight of 8±1.0 grams.

The honda arm sock 18 weight and dimensions were determined to be optimum for a honda 3.5±1.0 inches long by 1.5±1.0 inches wide. Thus, the optimized honda arm sock length 24 was determined to be 80%±15% of honda length 21, for a honda length 21 of 3.5±1.0 inches and a honda width 22 of 1.5±1.0 inches.

While a preferred embodiment of the invention has been illustrated herein, it is to be understood that changes and variations may be made by those skilled in the art without departing from the spirit of the appending claims. These changes may include changes in materials and dimensions.

Drawing Item Index 2 lariat
4 tail
6 honda
7 honda knot
8 honda aperture
10 arrow
12 lariat loop
14 burner
16 honda arm
18 honda arm sock
20 tail sock
21 honda length 22 honda width
24 honda arm sock length
25 burner length

I claim:

1. An improved lariat comprising a honda attached to a tail at a honda knot, said honda comprising two honda arms emanating from said honda knot, and a honda arm sock disposed around at least one said honda arm immediately adjacent said honda knot, whereby a closure speed of said improved lariat is increased.

2. The improved lariat of claim 1 wherein said honda arm sock is manufactured of low friction material, whereby a closing speed of a lariat loop formed by passing an extreme of said tail opposite said honda through said honda may be increased.

3. The improved lariat of claim 2 wherein said honda arm sock is manufactured of polyvinyl chloride (PVC).

4. The improved lariat of claim 1 further comprising a tail sock disposed around said tail adjacent said honda knot.

5. The improved lariat of claim 4 wherein said tail sock is manufactured of polyvinyl chloride (PVC).

6. The improved lariat of claim 4 further comprising a burner disposed around said honda opposite said honda knot.

7. The improved lariat of claim 6 wherein said burner is made of rawhide.

8. An improved lariat comprising a honda attached to a tail at a honda knot, said honda comprising two honda arms emanating from said honda knot, and a honda arm sock disposed around each said honda arm immediately adjacent said honda knot, whereby a closure speed of said improved lariat is increased.

9. The improved lariat of claim 8 wherein each said honda arm sock is manufactured of low friction material, whereby a closing speed of a lariat loop formed by passing an extreme of said tail opposite said honda through said honda may be increased.

10. The improved lariat of claim 9 wherein each said honda arm sock is manufactured of polyvinyl chloride (PVC).

11. The improved lariat of claim 8 further comprising a tail sock disposed around said tail adjacent said honda knot.

12. The improved lariat of claim 11 wherein said tail sock is manufactured of polyvinyl chloride (PVC).

13. The improved lariat of claim 11 further comprising a burner disposed around said honda opposite said honda knot.

14. The improved lariat of claim 13 wherein said burner is made of rawhide.

15. An improved lariat comprising a honda attached to a tail at a honda knot, said honda comprising two honda arms emanating from said honda knot, and a low-weight honda arm sock disposed around at least one said honda arm immediately adjacent said honda knot, whereby a closure speed of said improved lariat is increased.

16. The improved lariat of claim 15 wherein said honda arm sock weighs 1.5±1.0 grams.

17. The improved lariat of claim 15 wherein a length of said honda arm sock is 3±1.0 inches.

18. The improved lariat of claim 15 wherein a length of said honda arm is 80%±15% of a length of said honda.

19. The improved lariat of claim 15 wherein each said honda arm sock weighs 1.5±1.0 grams.

20. The improved lariat of claim 15 wherein a length of each said honda arm sock is 3±1.0 inches.

21. The improved lariat of claim 15 wherein a length of each said honda arm is 80%±15% of a length of said honda.

22. An improved lariat comprising a honda attached to a tail at a honda knot, said honda comprising two honda arms emanating from said honda knot, and a low-weight honda arm sock disposed around each said honda arms immediately adjacent said honda knot, whereby a closure speed of said improved lariat is increased.

\* \* \* \* \*